H. CUNNINGHAM.
COMBINED COTTON CHOPPER AND CULTIVATOR.
APPLICATION FILED MAY 10, 1913.
1,088,546.  Patented Feb. 24, 1914.
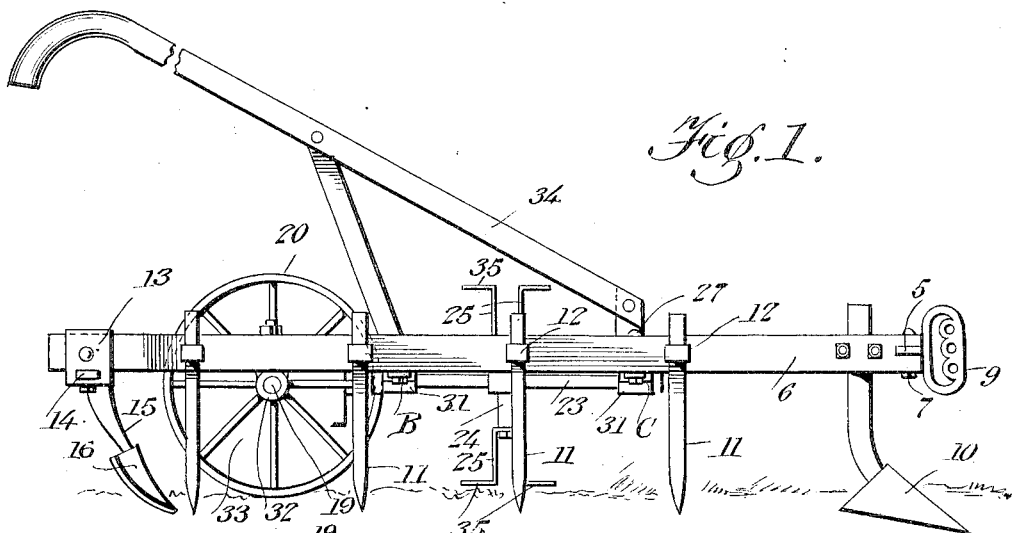
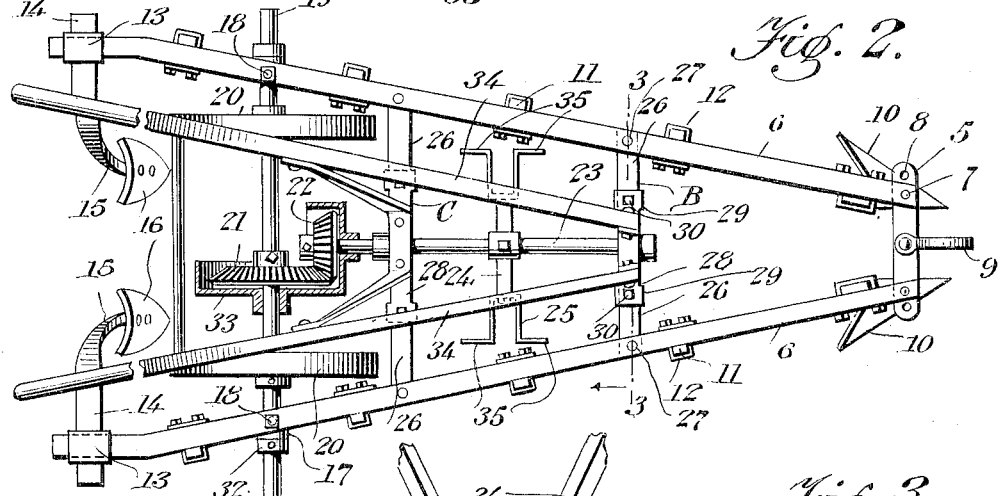
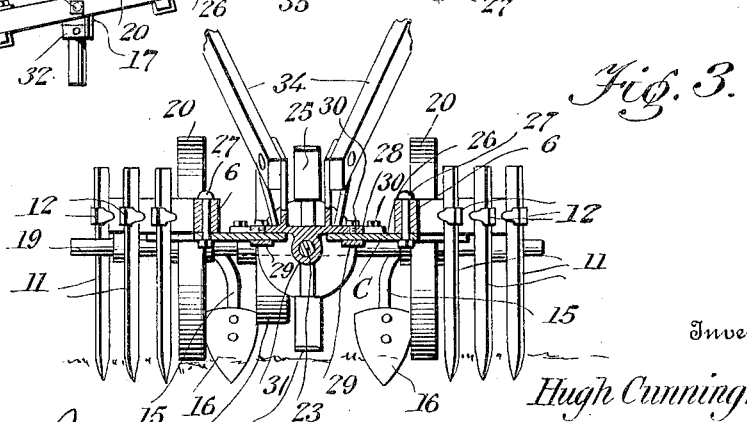
Inventor
Hugh Cunningham
By Victor J. Evans
Attorney
Witnesses

UNITED STATES PATENT OFFICE.

HUGH CUNNINGHAM, OF CORONA, ALABAMA.

COMBINED COTTON CHOPPER AND CULTIVATOR.

1,088,546.　　　Specification of Letters Patent.　　Patented Feb. 24, 1914.

Application filed May 10, 1913. Serial No. 766,787.

*To all whom it may concern:*

Be it known that I, HUGH CUNNINGHAM, a citizen of the United States, residing at Corona, in the county of Walker and State of Alabama, have invented new and useful Improvements in Combined Cotton Choppers and Cultivators, of which the following is a specification.

This invention relates to farm implements, and it has particular reference to an improved combined cotton chopper and cultivator.

One object of the invention is to produce a simple and efficient machine combining a frame carrying cultivating elements, said frame being adjustable as to width, with a rotary cotton chopping device.

A further object of the invention is to simplify and improve the construction of the frame including relatively stationary bearing members for the chopper carrying shaft, and laterally adjustable side members.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation of a machine constructed in accordance with the invention. Fig. 2 is a top plan view of the same. Fig. 3 is a transverse sectional view taken on the line 3—3 in Fig. 2.

Corresponding parts in the several figures are denoted by like characters of reference.

The frame of the improved machine includes a front bar 5 with which the beams or side members 6, 6 are adjustably connected by means of pivot members, such as bolts 7, for the passage of which the front bar 5 is provided with series of perforations 8. A clevis 9 connected with the front bar may be utilized for the attachment of draft, one or more draft animals being used, as may be found desirable. Each side member 6 carries at the front end thereof a barring-off plow 10, and each side member carries at suitable intervals earth engaging cultivating implements or harrow teeth 11, the same being secured upon the beams 6 by means of clips 12. Each beam carries at the rear end thereof a cuff 13 wherein a bar 14 is laterally adjustable, each of said bars being provided at its inner end with a downturned standard 15 carrying a cultivator blade 16 which in practice will operate to throw the loose dirt toward the row of plants which has been barred off by the plows 10.

Each of the beams or side members 6 carries a box or bearing member 17 connected therewith by a pivot member 18, said boxes affording bearings for a transverse shaft 19 having transporting wheels 20. The shaft or axle 19 also carries a bevel gear 21 meshing with a bevel pinion 22 at the rear end of a longitudinally disposed shaft 23 having radially extending arms 24 carrying the chopping hoes 25. The beams or side members 6 are connected together adjustably by means of cross bars B and C, each including end members 26 that are connected with the beams 6 by pivot members 27, and an intermediate member 28 provided with cuffs 29 wherein the end members 26 are adjustably secured by means of set screws 30. The intermediate member 28 of each cross bar also carries a bearing member 31 for the longitudinal shaft 23.

It will be readily seen that by loosening the set screws 30, the side members or beams 6 may be rocked about the pivot members 7 to move the rear ends of said beams outward or inward, as may be desired; after being suitably spaced apart they may be secured by tightening the set screws 30. When such adjustment is made, the position of the bearing members supporting the longitudinal shaft 23 will obviously remain unaltered, while the bearing members 17 will slide along the shaft or axle 19 until the desired adjustment is effected, the boxes 17 adjusting themselves to the requisite angle about the pivot members 18, whereby they are connected with the beams 6. For the purpose of preventing longitudinal displacement of the axle, said axle may be provided with set collars 32 abutting on the outer faces of the bearing members 17.

A suitable gear casing 33 is provided for the gears 21, 22. Handles 34 have also been shown, said handles being suitably connected with the cross bars of the machine.

The chopping hoes 25 are preferably of the approximately U-shaped construction, clearly seen in Figs. 1 and 2, and are provided with terminal laterally extending cutting members 35. It will be readily understood that when the machine is in operation, and the shaft 23 is rotated, the hoes will cut across the row of plants, leaving stands, the dimensions of which are governed by the width of the U-shaped body of the hoe, while the lateral cutters 39 will remove the superfluous plants, said cutting members being of proper length to form overlapping cuts.

The improved machine, as will be seen, is very simple in its construction, and the length of the beams need not exceed forty or forty-five inches, thus making a light and at the same time efficient tool which may be easily drawn by one draft animal, and the operation of which does not require great skill or strength. At the same time, a machine is provided by this invention whereby the work of barring off, chopping and cultivating the cotton may be performed in a very rapid and efficient, as well as economical and labor saving manner.

Having thus described the invention, what is claimed as new, is:—

1. In a machine of the class described, a frame including a front bar, beams pivotally connected therewith, cross bars connecting the beams, each of said cross bars including end members that are pivoted on the beams and intermediate members having cuffs wherein the end members are adjustably secured, boxes carried by the intermediate members, a longitudinal chopper carrying shaft supported for rotation in the boxes, bearing members pivoted on the beams, a wheel carrying axle supported for rotation in the bearing members, and intermeshing gears on the axle and the longitudinal shaft.

2. In a machine of the class described, a frame comprising a front bar, side members pivotally connected therewith and extensible and collapsible cross bars connecting the side members, said cross bars including intermediate members having boxes, a longitudinal chopper carrying shaft supported for rotation in the boxes, bearing members connected pivotally with the side members of the frame, a wheel carrying axle supported for rotation in said bearing members, and intermeshing gears on the axle and the longitudinal shaft.

3. In a machine of the class described, a frame including a front bar, side members pivotally connected therewith and cross bars whereby the side members are adjustably connected, each of said cross bars including a plurality of adjustably connected members, a longitudinal shaft supported for rotation on relatively stationary members of the cross bar, bearing members connected pivotally with the side members of the frame, a wheel carrying axle supported for rotation in said bearing members, means for transmitting motion from the axle to the longitudinal shaft, earth engaging members carried by the frame, and chopping members carried by the longitudinal shaft.

In testimony whereof I affix my signature in presence of two witnesses.

HUGH CUNNINGHAM.

Witnesses:
  W. I. COLVERT,
  NOAH GARDEN.

---

Copies of this patent may be obtained for five cents each, by addressing the "Commissioner of Patents, Washington, D. C."